(12) United States Patent
Salamanca

(10) Patent No.: US 7,551,981 B2
(45) Date of Patent: Jun. 23, 2009

(54) ROBOT SYSTEM AND METHOD FOR INSPECTING AND REPAIRING CASTS IN SMELTING PROCESSES

(76) Inventor: Hugo Salamanca, Av. Suecia 84, Oficina 43, Providencia, Santiago, RM (CL)

(*) Notice: Subject to any disclaimer, the term of this patent is extended or adjusted under 35 U.S.C. 154(b) by 147 days.

(21) Appl. No.: 11/598,144

(22) Filed: Nov. 13, 2006

(65) Prior Publication Data
US 2007/0156287 A1  Jul. 5, 2007

Related U.S. Application Data

(60) Provisional application No. 60/734,984, filed on Nov. 10, 2005.

(51) Int. Cl.
*G05B 19/18* (2006.01)

(52) U.S. Cl. .................. 700/259; 700/245; 700/247; 700/258; 414/729; 414/737; 318/568.11; 451/57

(58) Field of Classification Search ............ 700/245, 700/247, 258, 259; 318/568.11; 901/2; 414/729, 414/737; 451/57
See application file for complete search history.

(56) References Cited

U.S. PATENT DOCUMENTS

| 6,678,583 | B2* | 1/2004 | Nasr et al. ............... 700/245 |
| 6,859,683 | B2* | 2/2005 | Parker et al. ............ 700/259 |
| 7,280,890 | B2* | 10/2007 | Seemann ................. 700/245 |
| 2004/0023495 | A1* | 2/2004 | Butterfield et al. ........ 438/692 |
| 2006/0151336 | A1* | 7/2006 | Butterfield et al. ........ 205/652 |
| 2006/0231414 | A1* | 10/2006 | Butterfield et al. ........ 205/662 |
| 2007/0144005 | A1* | 6/2007 | Salamanca ............ 29/890.124 |
| 2007/0144006 | A1* | 6/2007 | Salamanca ............ 29/890.124 |
| 2007/0145649 | A1* | 6/2007 | Salamanca ............ 266/78 |
| 2007/0145650 | A1* | 6/2007 | Salamanca ............ 266/79 |
| 2007/0147961 | A1* | 6/2007 | Salamanca ............ 405/232 |
| 2007/0151580 | A1* | 7/2007 | Salamanca ............ 134/18 |
| 2007/0152616 | A1* | 7/2007 | Salamanca ............ 318/568.11 |
| 2007/0153260 | A1* | 7/2007 | Salamanca ............ 356/237.1 |
| 2007/0169230 | A1* | 7/2007 | Salamanca ............ 901/2 |
| 2007/0185610 | A1* | 8/2007 | Salamanca ............ 700/197 |
| 2007/0267043 | A1* | 11/2007 | Salamanca ............ 134/6 |

OTHER PUBLICATIONS

Metso minerals, Autogenous/Semi-Autogenous Mills, 2002, Internet, p. 1-2.*

(Continued)

*Primary Examiner*—Khoi Tran
*Assistant Examiner*—McDieunel Marc
(74) *Attorney, Agent, or Firm*—Gottlieb, Rackman & Reisman, P.C.

(57) ABSTRACT

A robot system and method for the repair and/or inspection of cast surfaces in an automated comprising a robotic manipulator of at least 4 degrees of freedom and a gripping mechanism which allows taking a repair device from a tool holder rack located at one of its sides and moving it through a defined path to a repair and inspection area, where a repair process will be carried out in a sequential and programmed way to a number of cast faces to be defined. Additionally, the system allows carrying out an inspection process of the surfaces in a sequential and programmed way through the use of a vision system by taking from a tool holder rack or carrying an advanced vision system for the inspection of surfaces.

15 Claims, 3 Drawing Sheets

OTHER PUBLICATIONS

Figure 1:
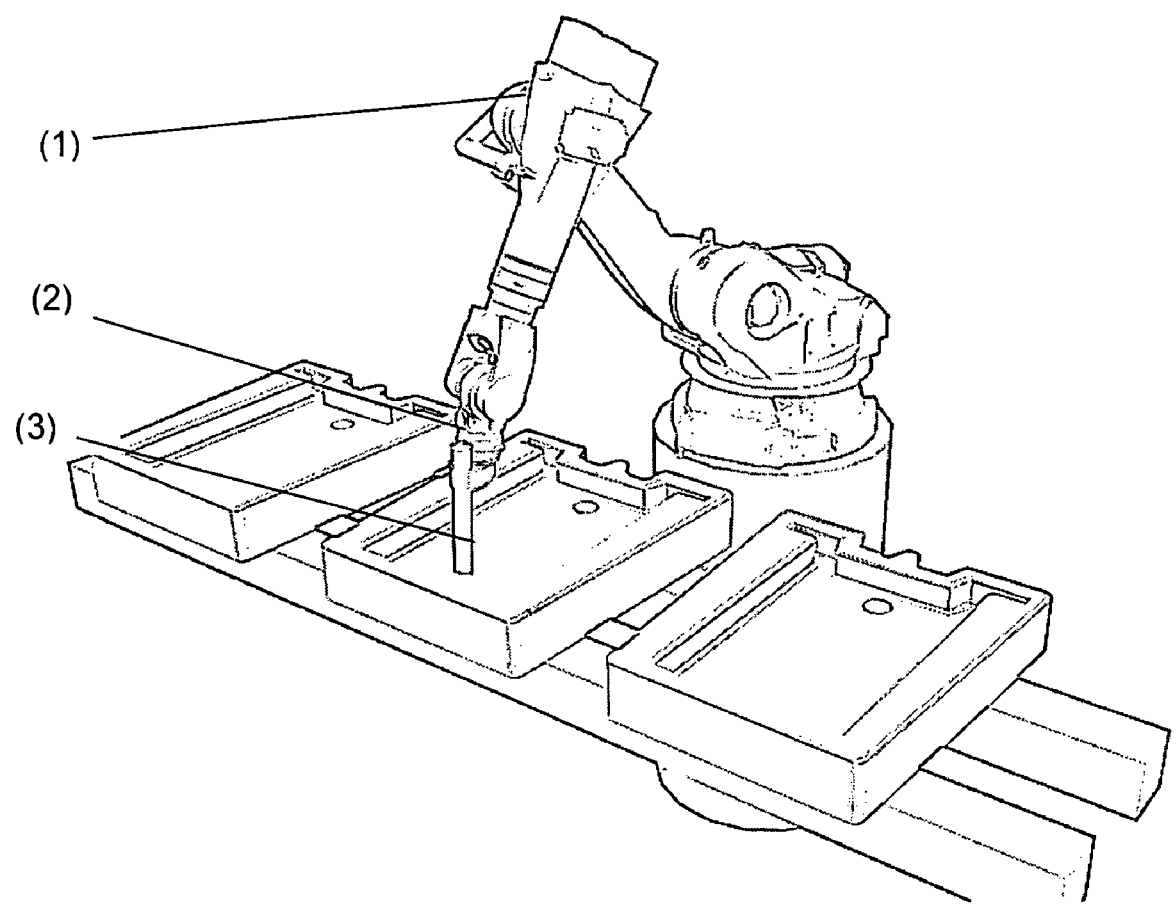

Metso minerals, Metso Capital Markets Day, 2004, Internet, p. 1-31.*
CSIRO, QCAT Annual Report—Queensland Center for Advanced Technologies, 2003, Internet, p. 1-32.*
Greer, Selection Criteria for Sag Mill Drive Systems, 1990, IEEE, p. 901-908.*
Spencer et al., Acoustic Emissions Monitoring of SAG Mill Performance, 1999, IEEE, p. 939-946.*
Sheble, ISA_Mining's new age, 2001, Internet, p. 1-4.*
CSIRO, QCAT Annual Report—Queensland Center for Advanced Technologies, 2005, Internet, p. 1-36.*
Agnico-Eagle Mines Ltd., Variable Speed Control of SAG Mill in the Mining Industry, 2004, MInternet, p. 1-2.*
Metso minerals, Metso Ball Mills, 2002, Internet, p. 1-2.*
Pontt et al., Current Issues on High-Power Cycloconverter—fed Gearless Motor Drives for Grinding Mills, 2003, IEEE, p. 369-374.*
Metso minerals, Minerals Processing Equipment, 2007, Internet, p. 1-16.*

* cited by examiner

ROBOT SYSTEM AND METHOD FOR INSPECTING AND REPAIRING CASTS IN SMELTING PROCESSES

CROSS-REFERENCE TO RELATED APPLICATIONS

This application claims the benefit of provisional patent application Ser. No. 60/734,984 filed 2005 Nov. 10 by the present inventor

FEDERAL SPONSORED RESEARCH

Not Applicable

SEQUENCE LISTING OR PROGRAM

Not Applicable

BACKGROUND

1. Field of Invention

This invention relates to the use of robotic technology in mining industry, specifically in smelting processes.

2. Prior Art

During metal obtention and refining processes, smelting furnaces are used to cast metal concentrates for purifying and extracting them. The first stage of the productive process is to move the dry concentrate to one of these furnaces, which could be a flash furnace and/or a Teniente converter, where casting is at temperatures over 1.200° C. In this way, while the concentrate becomes a molten liquid mass, its components are being separated and combined to form a two layer bath. The heaviest layer is called matte and it is a metal enriched component. Over this layer, the slag is floating, which is a coat of impurities of the metal of interest. In this way and during successive stages, the stage which is rich in the metal is sequentially cast and refined through several furnaces which allows to obtain a high purity metal.

In the last stage of the smelting process, the fire refining stage is carried out in which the metal is processed in rotary furnaces, by adding special purifying agents which are called fluidizing agents to oxide and eliminate all the impurities with the resulting effect of very few non desired elements contained in the molten bath. Then, the oxygen is extracted with steam or oil injections with the final result of a high purity level.

Thus, when a metal load reaches the required purity level, the furnace is inclined and in exact quantities the metal is poured into one of the ingot casts of the fire refined cast casting wheel. Once the metal is poured into the cast, the wheel rotates to advance the following cast into position and other ingot is cast. In this way, the wheel speed is adjusted in an accurate way to the optimum speed profile, ensuring a smooth acceleration and disacceleration level of the casts. This is intended to produce high quality ingots with a minimum burr formation grade.

To finish the smelting process, the dislodging process (stripping and/or extraction) proceeds in which the cast ingots are lifted and sent to a cooling tank to avoid the excessive oxidation and to obtain a deep scrubbing.

Finally, the cast ingots are counted and arranged in predetermined bundles or at distances required by the electrolytic plant. The discharge of cooling tanks is carried out whether by a forklift or by anode lifting device.

Once the casting process has been ended, the casts are reviewed and those presenting cracks or adherence of material are removed for repair. They are later reinstalled in the casting wheel.

Particularly, the repair of casts in the way it is performed today has the disadvantage of being carried out manually or in a semiautomatic way which means less efficiency of the system. On the other hand the superficial inspection has the disadvantage of being performed visually in many cases or with low levels of advanced technology vision applications. Similarly, in many cases, the operators are subjected to a high physical demand and harsh environmental conditions.

SUMMARY

A robot system and method for the repair and/or inspection of cast surfaces in an automated way have been developed.

DRAWINGS—FIGURES

FIG. 1. View of a robotic manipulator repairing (caulking) a cast

Figure 2:
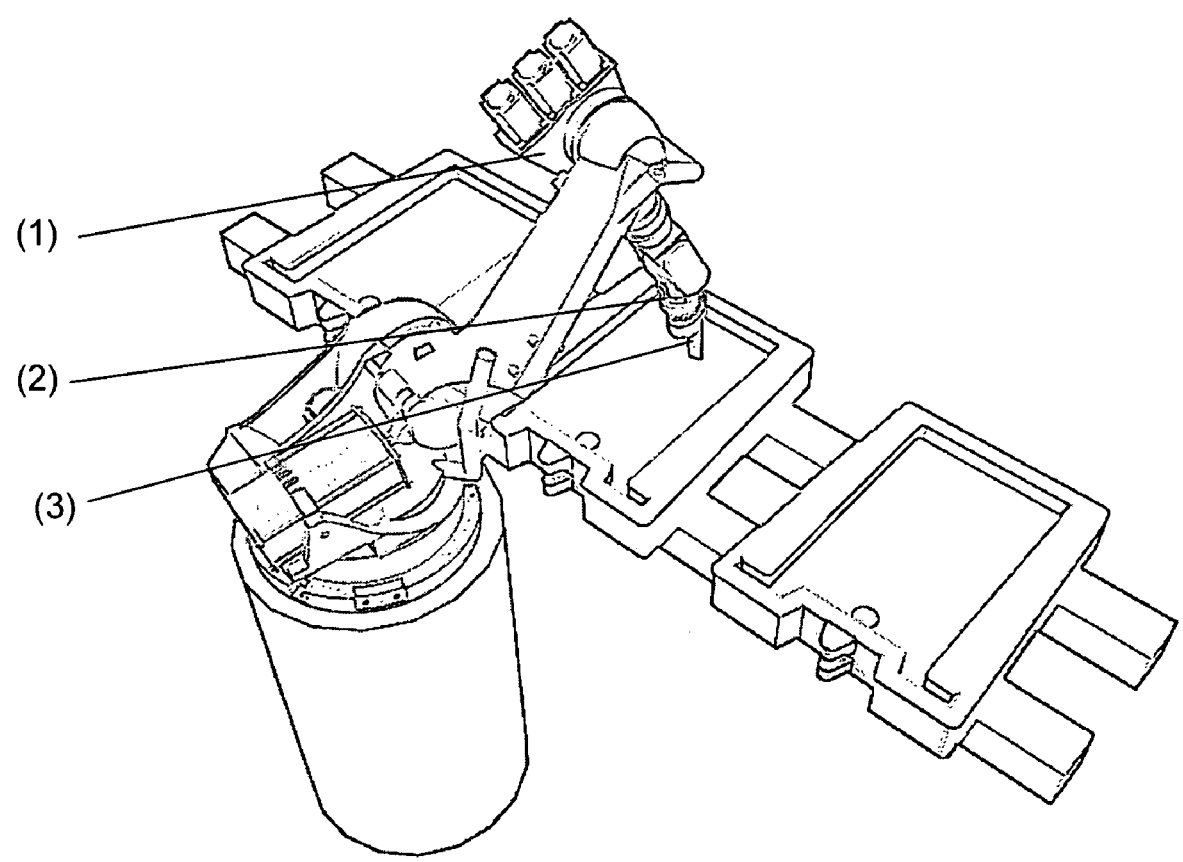

FIG. 2. View of a robotic manipulator repairing (caulking) a cast

Figure 3:
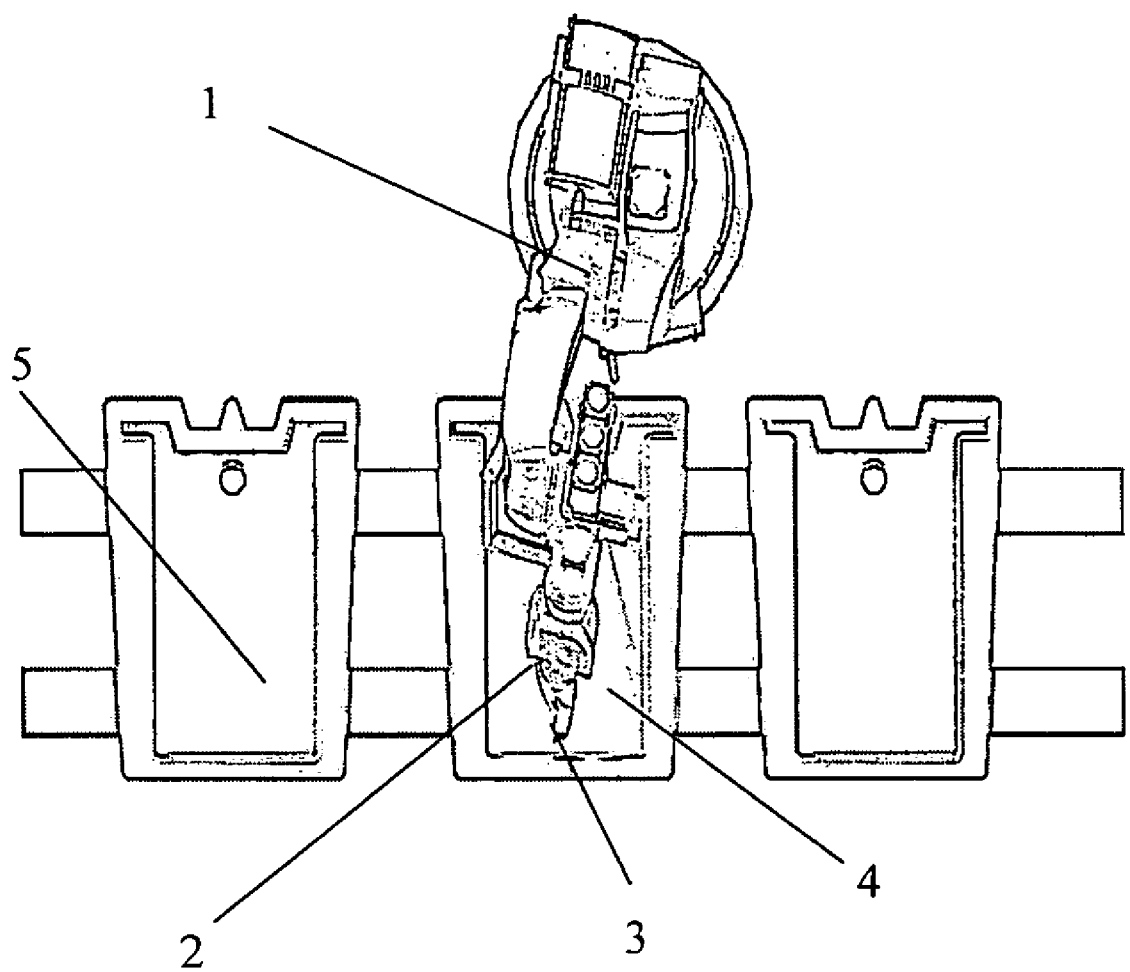

FIG. 3. General layout of a robot system repairing and inspecting of cast surfaces

DRAWINGS—REFERENCE NUMERALS

1. Robotic manipulator
2. Gripping mechanism
3. Repair device
4. Repair and inspection area
5. Casts

DETAILED DESCRIPTION

This invention relates to a new robot system as well as a robotic method for the repair and/or inspection of cast surfaces in an automated way which is carried out automatically through anthropomorphous robotic arms of at least 4 degrees of freedom, which are installed at one side of the repair and inspection area in the copper field.

With reference to FIG. 1, FIG. 2, and FIG. 3, the robot system is composed mainly of one robotic manipulator (1) of at least 4 degrees of freedom, provided with a communication, acquisition and control system, and a gripping mechanism (2) to allow to take the repair device (3) from a tool holder rack located at one of its sides, which is moved through a defined path to the repair and inspection area (4), where the hammering process is carried out in a sequential and programmed way, to a number of faces to be defined of the casts (5).

Additionally the configuration of this system allows an inspection process of the surface in a sequential and programmed way through a second tool provided with an advanced vision system for the surface inspection from a tool holder rack or it could be mounted on the robotic arm.

I claim:

1. A robot system for the repair and/or inspection of cast surfaces in metal smelting processes comprising
   an anthropomorphous robotic arm of at least 4 degrees of freedom,
   a control, communication and programming unit,
   a gripper adapter,
   a pneumatic gripper,
   a pneumatic gripper driving system, a electric supply system,
a repair system,
an advanced vision system for the inspection of surfaces and
a tool holder
wherein said pneumatic gripper allows in a sequential and programmed way said anthropomorphous robotic arm to take, manipulate and release a repair device and/or an advanced vision system for the inspection of surfaces from a tool holder rack in such a way that said device and/or vision system moves through a defined path to said cast surface,
wherein said anthropomorphous robotic arm moves said device and/or vision system through a defined path to the cast surface, so as to facilitate repair and inspection process of surfaces in different paths within the work volume of the robot system, and
wherein said anthropomorphous robotic arm includes an electrical system driven by three-stage induction motors, with vectorial and/or scalar control.

2. The robot system according to claim 1, wherein said gripper takes, manipulates and releases a repair device and/or a system of vision advanced inspection of surfaces to carry out the repair and inspection of surfaces in different paths within the work volume of the robot system.

3. The robot system according to claim 1, wherein said anthropomorphous robotic arm has the capability to take, manipulate and release a repair device and/or a system of vision advanced inspection of surfaces and move said device and/or inspection system in different paths within the work volume of the robotic system.

4. The robot system according to claim 1, wherein said pneumatic gripper in a sequential and programmed way to takes, manipulates and releases a repair device and/or system of vision advanced inspection of surfaces moves said device and/or inspection system in different paths within the work volume of the robotic system.

5. The robot system according to claim 1, wherein the anthropomorphous robotic arm could communicates by itself or through a program logic controller interface within said control unit.

6. The robot system according to claim 1, wherein the anthropomorphous robotic arm includes the capability to obtain and interpret the information from installed analogue and/or digital sensors.

7. The robot system according to claim 1, wherein the anthropomorphous robotic arm includes the capability to generate analogue and/or digital signals to control analogue and/or digital input devices.

8. The robot system according to claim 1, wherein said anthropomorphous robotic arm of is mounted on a fixed and/or mobile system.

9. The robot system according to claim 1, wherein productivity and efficiency of the repair and inspection of cast surfaces increases.

10. The robot system according to claim 1, wherein said robot system could be used for carrying out repair and inspection of surfaces either selectively or collectively.

11. The robot system according to claim 1, wherein said robot system includes the capability to move and manipulate different tools in different paths within the work volume of said robot system.

12. The robot system according to claim 1, wherein said robot system may operate automatically or semi-automatically and also allows solutions scalability.

13. The robot system according to claim 1, wherein said robot system limits allows the final user of the technology to carry out the repair and inspection either selectively, independently, separately or in aggregate.

14. The robot system according to claim 1, wherein said robot system limits the final user of the technology to one or two of the repair and/or inspection activities of cast surfaces, either selectively or in aggregate.

15. A robotic method for the repair and/or inspection of cast surfaces in metal smelting processes using the robot system of claim 1
wherein said pneumatic gripper allows in a sequential and programmed way said anthropomorphous robotic arm to take, manipulate and release a repair device and/or an advanced vision system for the inspection of surfaces from a tool holder rack in such a way that said device and/or vision system moves through a defined path to said cast surface, and
wherein said anthropomorphous robotic arm moves said device and/or vision system through a defined path to the cast surface, so as to facilitate repair and inspection process of surfaces in different paths within the work volume of the robot system.

* * * * *